(12) United States Patent
Houssat et al.

(10) Patent No.: US 11,383,678 B2
(45) Date of Patent: Jul. 12, 2022

(54) BLADE GUARD FOR A WIPER

(71) Applicant: Valeo Systèmes d'Essuyage, Le Mesnil Saint Denis (FR)

(72) Inventors: Stéphane Houssat, Issoire (FR); Vincent Gaucher, Issoire (FR); Olivier Faligot De La Bouvrie, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 82 days.

(21) Appl. No.: 16/504,729

(22) Filed: Jul. 8, 2019

(65) Prior Publication Data
US 2020/0010054 A1 Jan. 9, 2020

(30) Foreign Application Priority Data
Jul. 6, 2018 (FR) ...................................... 1856267

(51) Int. Cl.
  *B60S 1/38* (2006.01)
  *B05C 1/02* (2006.01)
  *B60S 1/04* (2006.01)

(52) U.S. Cl.
  CPC ................. *B60S 1/38* (2013.01); *B05C 1/02* (2013.01); *B60S 1/0491* (2013.01); *B60S 2001/3829* (2013.01); *B60S 2001/3836* (2013.01); *B60S 2001/3843* (2013.01)

(58) Field of Classification Search
  CPC ............... B60S 1/38; B60S 2001/3829; B60S 2001/3831; B60S 2001/3843; B60S 2001/3836; B60S 2001/3834; B60S 1/3848; B60S 1/0497; B60S 1/0491; B05C 1/02; B05C 1/025

USPC .......... 15/250.361, 250.48, 250.001, 257.07, 15/245, 246
See application file for complete search history.

(56) References Cited

U.S. PATENT DOCUMENTS

| 1,658,101 A | * | 2/1928 | Seveke | .................... B60S 1/524 |
| | | | | 15/250.03 |
| 1,919,236 A | * | 7/1933 | Lunsford | ................ B60S 1/524 |
| | | | | 15/250.03 |
| 2,085,608 A | * | 6/1937 | Rodrick | .................. B60S 1/524 |
| | | | | 15/250.03 |

(Continued)

FOREIGN PATENT DOCUMENTS

| DE | 10250874 | * | 2/2004 |
| DE | 102006036913 A1 | | 2/2008 |

(Continued)

OTHER PUBLICATIONS

Search Report and Written Opinion issued in corresponding French Application No. 1856267, dated Mar. 7, 2019 (6 pages).

*Primary Examiner* — Gary K. Graham
(74) *Attorney, Agent, or Firm* — Osha Bergman Watanabe & Burton LLP

(57) ABSTRACT

The invention relates to a blade guard (1) for a wiper (100) of a vehicle (200), the blade guard (1) comprising a first part (11) and a second part (12), the first part (11) being configured to allow the blade guard (1) to be attached on the wiper (100), the second part (12) being intended to come into contact with a glazed surface (50) of the vehicle (200), characterized in that the second part (12) is configured to contain a product to be applied onto the glazed surface (50). The invention also relates to a wiper (100) comprising such a blade guard (1).

8 Claims, 7 Drawing Sheets

(56) References Cited

U.S. PATENT DOCUMENTS

| | | | | |
|---|---|---|---|---|
| 3,631,561 A * | 1/1972 | Aszkenas | ............... | B60S 1/38 |
| | | | | 15/250.41 |
| 4,016,623 A * | 4/1977 | Nixdorf | ............... | B60S 1/38 |
| | | | | 15/250.03 |
| 4,019,216 A * | 4/1977 | Priesemuth | ............... | B60S 1/38 |
| | | | | 15/250.03 |
| 4,152,807 A * | 5/1979 | Smahlik | ............... | A47L 1/15 |
| | | | | 15/121 |
| 5,634,841 A * | 6/1997 | Gold | ............... | B24D 15/023 |
| | | | | 15/250.41 |
| 6,760,951 B1 * | 7/2004 | Wynen | ............... | B60S 1/3801 |
| | | | | 15/250.48 |
| 7,140,064 B1 * | 11/2006 | Woolstenhulme | ............... | B60S 1/0486 |
| | | | | 15/250.361 |
| 9,403,510 B2 * | 8/2016 | Ranucci | ............... | B60S 1/38 |
| 9,663,287 B1 | 5/2017 | Blackman | | |
| 2014/0259508 A1 | 9/2014 | Ranucci et al. | | |
| 2016/0288772 A1 | 10/2016 | Stewart | | |

FOREIGN PATENT DOCUMENTS

DE  202008016122 U1  4/2010
GB  426562  *  4/1935

\* cited by examiner

BLADE GUARD FOR A WIPER

The field of the present invention is that of blade guards for a wiper of a motor vehicle and, more generally, that of wipers of a motor vehicle.

In the prior art, treatments are known for temporarily making a glazed surface of a motor vehicle hydrophobic in order to enhance the action of a wiper of the motor vehicle and to improve the visibility through the glazed surface, particularly when water is on the glazed surface, by reducing the amount of water present on the glazed surface of the motor vehicle.

A known solution involves manually applying a hydrophobic solution onto the glazed surface of the motor vehicle. However, this solution has the disadvantage of being long and tedious for the user applying the hydrophobic solution onto the glazed surface, with this hydrophobic solution having to be applied by means of multiple passages over the glazed surface. Furthermore, it is difficult for the user to evenly apply the hydrophobic solution onto the glazed surface, which can result in a reduction in the effectiveness of the treatment, as well as in the appearance of traces on the glazed surface of the motor vehicle.

The aim of the present invention is to address at least some of the aforementioned disadvantages and to also provide other advantages. Thus, the aim of the invention is to propose a solution that allows a hydrophobic solution to be applied onto a glazed surface of a motor vehicle using a blade guard of a wiper.

Another aim of the invention is to propose a solution allowing the hydrophobic solution to be applied independently of the state of wear of the wiper blade of the wiper.

The invention achieves this aim, according to a first aspect, by virtue of a blade guard for a wiper of a vehicle, the blade guard extending along a longitudinal axis, the blade guard comprising a first part and a second part, the first part being configured to allow the blade guard to be attached on the wiper, innovative in that the second part is intended to come into contact with a glazed surface of the vehicle, the second part being configured to contain a product to be applied onto the glazed surface.

This configuration according to the first aspect of the invention thus allows the application of a product onto a glazed surface of a vehicle to be simplified, by using a blade guard of the wiper. Furthermore, the invention allows the product to be applied independently of the state of wear of the wiper blade of the wiper.

The second part is adapted to contain the product in that the product can be received and retained inside the second part or can be disposed on the external surface of the second part, in particular in a covering that covers said second part.

The second part is configured to either store the product prior to the use of the blade guard or be adapted to absorb the product that a user would apply onto the second part.

The blade guard according to the first aspect of the invention advantageously comprises at least one of the following improvements, with the technical features forming these improvements being able to be taken separately or in combination:

the blade guard comprises the product, said product being included in the second part of the blade guard. This configuration then allows a blade guard to be provided with a function for spreading the ready-to-use product. The product is then released when a pressure is exerted on the second part of the blade guard, in particular when the blade guard, mounted on a wiper, is applied onto the glazed surface of the vehicle. The aforementioned pressure advantageously is the pressure of a drive arm of the wiper forming a wiper system for a motor vehicle. Alternatively, the pressure can be manual and can be implemented by a user, who applies and moves the blade guard according to the invention;

according to a first alternative, the second part is formed by an absorbent material configured to contain the product. Thus, the absorbent material advantageously can be a spongy material, an open-cell structure synthetic foam, a felt or a fabric strip. According to this configuration, the product is intended to be absorbed in the second part of the blade guard. The second part thus can receive the product, retain the product prior to the use of the blade guard on the glazed surface, and help to spread the product over the glazed surface when the blade guard is used on the glazed surface;

according to a second alternative, the second part is configured to retain the product on its external surface. The second part in particular can be an elastomer, such as a rubber, or a part made of silicon;

according to the second alternative, the product is contained in a covering of the second part. This covering forms a layer disposed on the external surface of the second part. This configuration also allows a ready-to-use blade guard to be provided, with the product being applied onto the glazed surface of the vehicle when the wiper on which the blade guard is mounted is installed on the vehicle;

according to either of the aforementioned alternatives, the product contained in the second part or on the external surface thereof is generally in liquid or microcapsule form. Thus, the microcapsules, which contain the product, are present in the absorbent material of the second part according to the first alternative, or in the covering of the second part according to the second alternative. These microcapsules are configured to break when the blade guard performs reciprocating movements on the glazed surface of the vehicle, thus allowing the product to be applied onto the glazed surface;

according to an alternative to the aforementioned ready-to-use version, the second part can be filled, or refilled, with product by a user. Thus, the product, which is contained in a distinct reservoir of the blade guard, for example, a bottle, a flask and/or a hermetically sealed wipe, can be applied onto the second part by the user shortly before the use of the spreading function of the blade guard. This configuration allows the second part of the blade guard to be refilled with product, thus allowing the blade guard to be used several times to treat a glazed surface of the vehicle;

the product that is included in the second part or that is to fill this second part is a hydrophobic solution. This hydrophobic solution allows the amount of water to be dispersed by the wiper to be decreased and therefore allows the visibility through the treated glazed surface to be improved, by reducing the adherence of water, in particular of raindrops, likely to be projected onto the glazed surface of the vehicle;

the blade guard advantageously applies the product onto the glazed surface through twenty reciprocating movements of the blade guard over the glazed surface, with a reciprocating movement being a return movement of the blade guard between a first position and a second position, the first position being an initial position corresponding to a rest position of the blade guard and the second position being a final position corresponding to an active position of the blade guard.

Depending on the vehicle, in the event that the glazed surface is a windscreen, the first position of the blade guard, called rest position, can be along the bonnet, i.e. in a substantially horizontal position relative to the glazed surface, or even along a lateral pillar, i.e. in a substantially vertical position relative to the glazed surface, and the second position of the blade guard, called active position, in which the blade guard changes the direction of rotation in order to return to its initial position, can be along the bonnet, i.e. in a substantially horizontal position relative to the glazed surface, or even along a lateral pillar, i.e. in a substantially vertical position relative to the glazed surface.

More specifically, the product is applied onto the glazed surface by five to ten reciprocating movements;

the blade guard is configured to assume a first profile, in which the blade guard is curved along the longitudinal axis, and at least one second profile, in which the blade guard is substantially straight, in particular straight. The blade guard thus exhibits flexibility that allows, on the one hand, the curved profile of the wiper to be followed in order to fulfil its function of protecting the wiper blade in any situation other than application onto the glazed surface and, on the other hand, allows the glazed surface of the vehicle to be espoused, even during reciprocating movements of the blade guard. A first radius of curvature of the blade guard according to the first profile is strictly less than a second radius of curvature, which the blade guard according to the second profile falls within. The second profile is substantially straight, in that a glazed surface is not completely flat;

the first part demarcates a first volume and a second volume separated from each other by at least one partition, with the second part being at least partially housed in the second volume. The first volume is configured to house the wiper blade of the wiper;

the blade guard comprises this partition, which extends in a plane comprising the longitudinal axis of the blade guard and a transverse axis perpendicular to the longitudinal axis of the blade guard, with the partition forming a separation between the first volume and the second volume of the blade guard. Thus, the partition prevents any migration of the product from the second part to the first part when the blade guard is mounted on the wiper;

the second part comprises a first portion, the shape of which matches a shape of the second volume, and a second portion that projects from the second volume. Advantageously, the second portion extends out of the second volume of the first part of the blade guard and it is this portion of the second part that is specially adapted to come into contact with the glazed surface and to spread the product. This configuration thus allows the second part of the blade guard to be in abutment on the glazed surface without the first part touching the glazed surface, which limits the risk of causing any scratches on the glazed surface;

the partition can comprise at least one orifice extending between the first volume and the second volume, with the orifice allowing the application of the product onto the second part of the blade guard to be facilitated. More specifically, the orifice allows a connection to be provided between the first volume and the second volume of the first part of the blade guard. Thus, when the product is applied in the vicinity of the first volume of the blade guard, it can migrate towards the second part of the blade guard housed in the second volume. Advantageously, the product thus can be applied in the vicinity of a longitudinal end of the first volume, in order to migrate into the second volume and thus be in contact with the second part of the blade guard, with the longitudinal end of the first volume being easily accessible;

the first volume of the first part is demarcated by two edges located opposite the second volume in relation to the partition. More specifically, the two edges extend along the transverse axis, towards each other. Advantageously, the edges are separated along the transverse axis by a space. This configuration allows the wiper blade of the wiper to be kept at least partially housed in the first volume;

the wiper blade comprises a joint for housing the edges of the blade guard. More specifically, the dimension of the wiper blade along the transverse axis is smaller in the vicinity of the joint, thus defining two grooves, in which the first edge and the second edge of the blade guard are housed. Thus, the joint enables the blade guard to be kept on the wiper blade. Alternatively, the blade guard also can be kept on the wiper in the vicinity of a structural element of the wiper, such as a support for the wiper blade or an air deflector;

the blade guard comprises a protective strip configured to protect the second part. The purpose of this protection is to reduce the risk of damage to the second portion of the second part of the blade guard. The protective strip also provides protection for the second part by reducing the exposure of the second part, and therefore of the product included in the second part, to the external environment. The protective strip particularly allows the risk of the second part drying out to be reduced, thus increasing the shelf life of the product to be applied, for example, when the blade guard is stored individually or is fitted with a wiper. The protective strip is intended to be removed prior to the use of the blade guard on the glazed surface of the vehicle, in order to allow the product to be applied onto the glazed surface;

the second part of the blade guard is located between the first part of the blade guard and the protective strip;

the protective strip is, for example, adhered on the second part. Alternatively, the protective strip is adhered on the second part and/or on the first part of the blade guard. Advantageously, when the protective strip is adhered on the first part, the second part is fully confined in the second volume of the first part of the blade guard, thus maximizing the reduction of the exposure of the second part, and therefore of the product that it contains, to the external environment, in order to increase the shelf life of the product contained in the second part. Advantageously, when the protective strip is removed from the blade guard, the second part then at least partially extends out of the second volume of the first part of the blade guard;

the first part is made of synthetic material. Advantageously, the first part is obtained by extrusion or by moulding;

the first part and the second part are obtained by co-extrusion;

the blade guard can be sold as original equipment, i.e. intended for vehicle manufacturers, in order to fitted on the vehicle when it is manufactured. The blade guard also can be sold in an after-sales network, as a spare part, in particular with dealerships or vehicle spare parts sales companies;

the vehicle is a motor vehicle. More specifically, the motor vehicle is a car or a heavy goods vehicle.

According to a second aspect, a further aim of the invention is a wiper comprising at least one wiper blade and a blade guard according to the first aspect of the invention.

This configuration according to the second aspect allows a wiper to be provided that comprises a blade guard for applying a product onto a glazed surface of a vehicle, with the wiper being ready-to-use, i.e. ready to be installed on the motor vehicle.

The wiper according to the second aspect of the invention advantageously comprises at least one of the following improvements, with the technical features forming these improvements being able to be taken individually or in combination:
- the wiper blade is housed inside the first part of the blade guard. More specifically, the wiper blade is housed inside the first volume of the first part of the blade guard;
- a gap is provided between the wiper blade and the first part of the blade guard. In other words, the wiper blade is not in abutment against the partition of the first part or against the walls of this first part. This configuration allows the blade guard to protect the wiper blade, which is then isolated from any impacts and contact with the blade guard;
- the wiper can be sold as original equipment, i.e. intended for vehicle manufacturers, in order to be fitted on the vehicle when it is manufactured. The wiper also can be sold in an after-sales network, as a spare part, in particular with dealerships or vehicle spare parts sales companies.

Further features, details and advantages of the invention will become more clearly apparent, on the one hand, upon reading the following description and, on the other hand, from several embodiments, which are provided by way of non-limiting examples, with reference to the accompanying schematic drawings, in which.

The features, the variants and the various embodiments of the invention can be associated with one another, in various combinations, to the extent that they are not incompatible with or exclusive from one another. In particular, it is possible to contemplate variants of the invention comprising only a selection of the features described hereafter independently of the other described features, if this selection of features is sufficient to provide a technical advantage or to differentiate the invention from the prior art.

In particular, all the variants and all the embodiments that are described can be combined together if nothing precludes this combination from a technical perspective.

Figure 1:
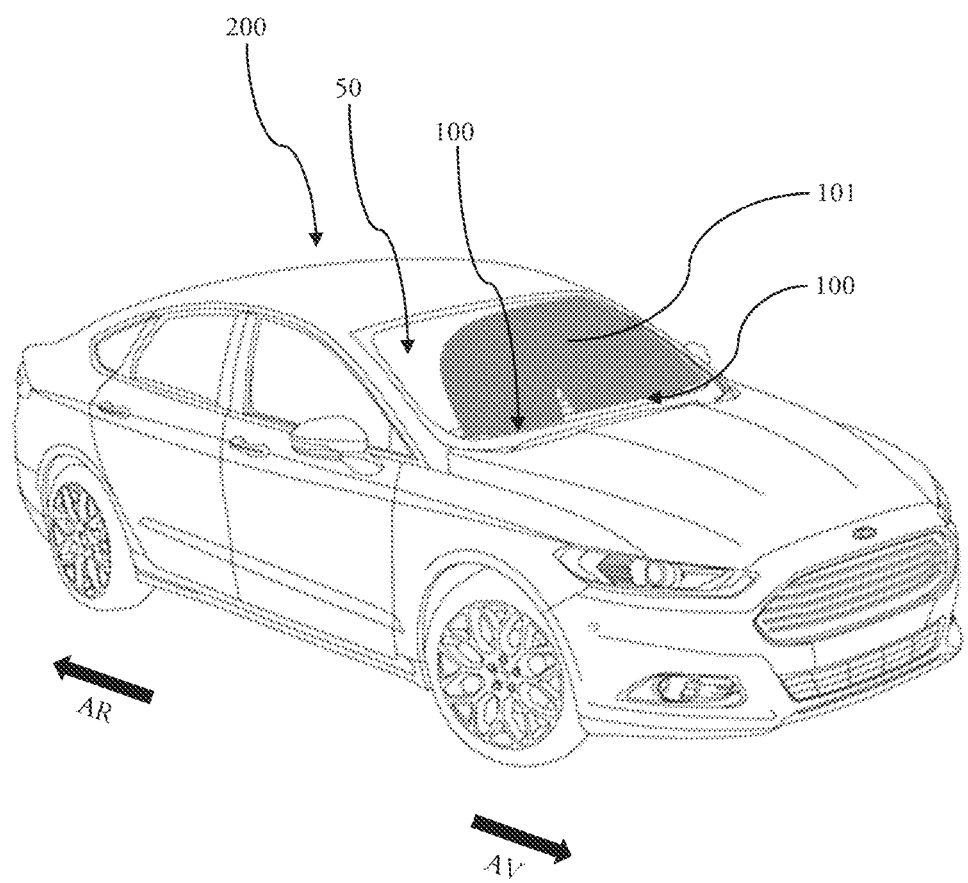
FIG. 1 is a simulated view of a motor vehicle, onto which a product is applied using a blade guard according to the first aspect of the invention.

FIG. 1 shows a simulated view of a motor vehicle 200, on which a product is applied onto a glazed surface 50 of the motor vehicle 200 using a blade guard, not shown in FIG. 1, mounted on a wiper 100.

Thus, the motor vehicle 200 comprises two wipers 100 in abutment on the glazed surface 50 of the motor vehicle 200. In this case, the glazed surface 50 is a windscreen, located at the front FR of the motor vehicle 200, but the glazed surface also could be a rear window, located at the rear RR of the motor vehicle 200, or even any glazed surface on which a wiper 100 is mounted.

When they are activated, the wipers 100 perform reciprocating movements on the glazed surface 50, thus defining a wiping surface 101. Thus, when a blade guard according to the invention, not shown in FIG. 1, is mounted on a wiper 100, the blade guard allows a product to be applied in the vicinity of the wiping zone 101 of the glazed surface 50.

Figure 2:
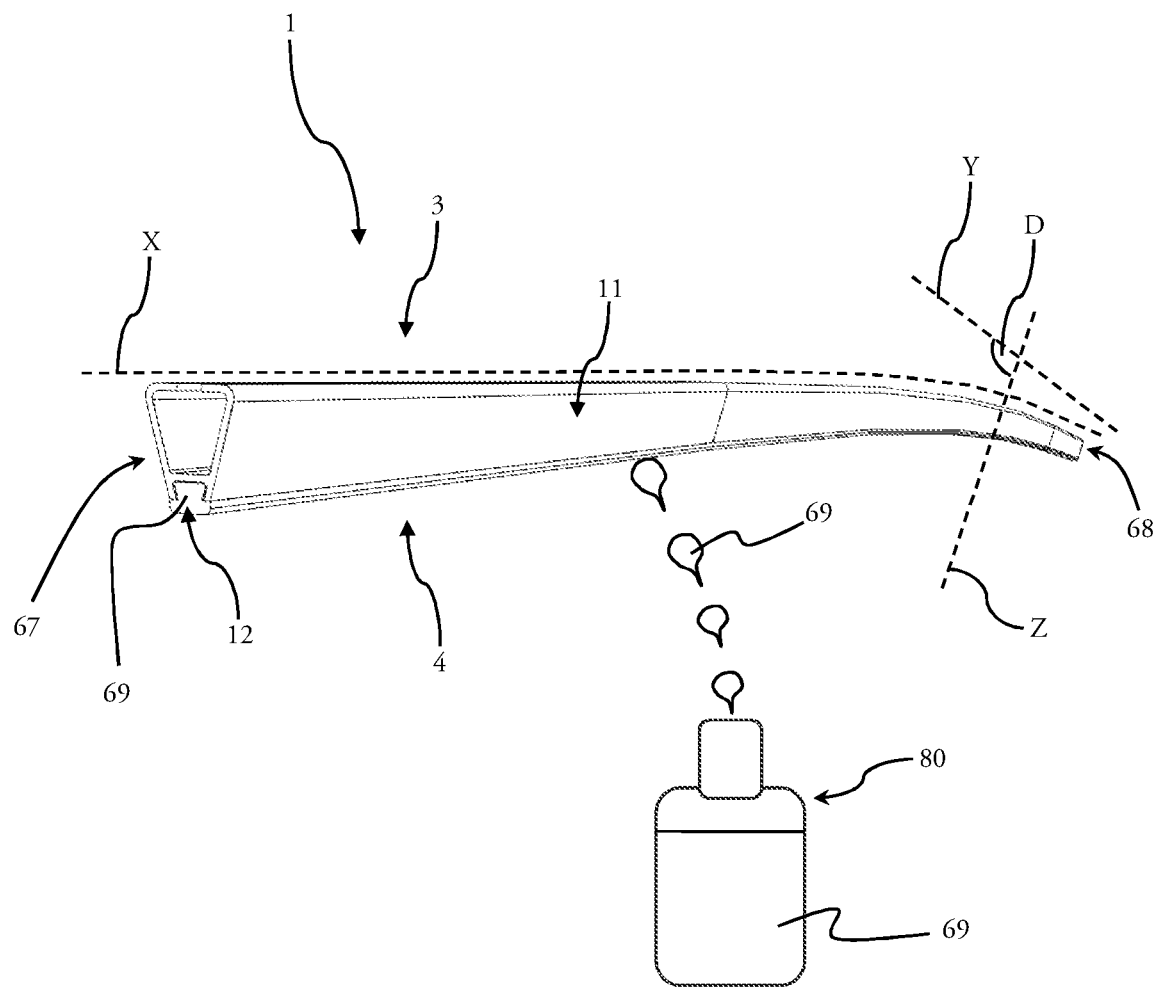
FIG. 2 is a perspective view of an embodiment of a blade guard according to the first aspect of the invention.

FIG. 2 shows an embodiment of a blade guard 1 for a wiper 100 of a motor vehicle 200, with the blade guard 1 being a blade guard according to the first aspect of the invention.

The blade guard 1 predominantly extends along a longitudinal axis X. The blade guard 1 also extends along a transverse axis Y and along a vertical axis Z, with the transverse axis Y and the vertical axis Z defining a plane D perpendicular to the longitudinal axis X. The longitudinal axis X has a curvature in a plane XZ, with the curvature allowing the blade guard 1 to espouse a curved profile of the wiper before the wiper is applied against the glazed surface. The blade guard 1 is flexible in order to be able to assume a first profile, called curved profile, corresponding to the profile of the wiper prior to its use, and a second profile, called straight profile, or substantially straight due to the curvature of the glazed surface 50 of the motor vehicle 200 on which the blade guard 1 is intended to come into abutment.

The blade guard 1 comprises a first part 11 and a second part 12, both extending along the blade guard 1 along the longitudinal axis X. More specifically, the blade guard 1 extends along the vertical axis Z between a first end 3 and a second end 4 located opposite the blade guard 1 relative to the first end 3, with the first part 11 of the blade guard 1 being located in the vicinity of the first end 3 of the blade guard 1 and the second part 12 of the blade guard 1 being located in the vicinity of the second end 4 of the blade guard 1. The blade guard 1 also extends along the longitudinal axis X from a first longitudinal end 67 to a second longitudinal end 68, with a section of this blade guard 1 being generally of identical shape from the first longitudinal end 67 to the second longitudinal end 68.

The second part 12 is intended to receive and to contain a product 69, such as a hydrophobic solution, in order to treat the glazed surface of a motor vehicle.

According to a first embodiment shown in FIG. 2, the blade guard 1 is sold with a second part 12 that already contains the product 69. Such a configuration of the invention thus allows a ready-to-use blade guard 1 to be provided to spread the product 69 over the glazed surface. In such an embodiment, the second part 12 can be an absorbent material for the product 69 or a synthetic material that comprises supplements, in particular microcapsules of products, or even a synthetic material, the external surface of which receives a deposit of a covering made of or comprising the product 69.

The absorbent material advantageously can be a spongy material, an open-cell structure synthetic foam for containing or retaining the product 69, a felt or a fabric strip. The synthetic material can be an elastomer, for example, in particular a part made of silicon, onto which the covering containing the product 69 can be applied. The second part 12 thus can receive the product 69, retain it prior to the use of the blade guard 1 and help to spread it on the glazed surface when the blade guard is used.

According to a second embodiment, also shown in FIG. 2, the blade guard 1 is sold without the product 69, but is supplemented with a flask 80 comprising the product to be applied by the blade guard 1 onto the glazed surface. Thus, the product 69, which advantageously is in liquid form, can be applied by the user in the vicinity of the second part 12 of the blade guard 1. This configuration therefore allows the user to fill the second part 12 of the blade guard 1 shortly before use, promoting the shelf life of the product 69, since the product is stored in the flask 80. This configuration also allows the second part 12 to be refilled with the product, thus allowing several uses of the blade guard 1 for treating the glazed surface 50 of a motor vehicle 200.

Figure 3:
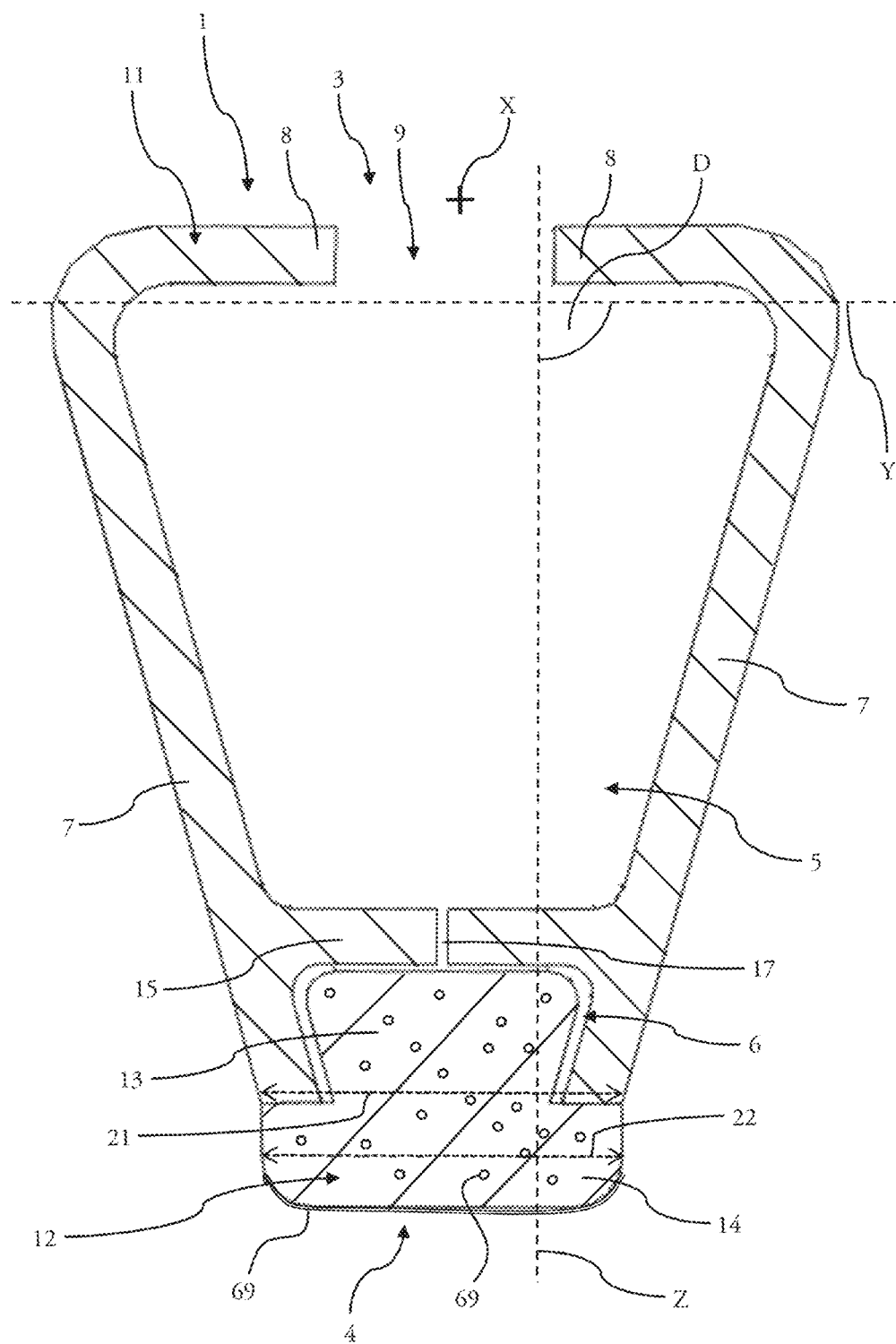
FIG. 3 is a transverse section view of the blade guard shown in FIG. 2.

FIG. 3 shows a transverse section view of the blade guard 1 shown in FIG. 2. In other words, FIG. 3 is a section view along the plane D of the blade guard 1 shown in FIG. 2.

The first part 11 of the blade guard 1 is one-piece. It demarcates a first volume 5 and a second volume 6, with the first volume 5, which is located in the vicinity of the first end 3, being intended to house a wiper blade of the wiper. The second volume 6, which is located in the vicinity of the second end 4, houses or receives the second part 12 of the blade guard 1. More specifically, the first part 11 comprises two sides 7 extending in a flared manner, with the two sides 7 being connected together by a partition 15 extending in a plane XY, thus allowing the first volume 5 to be separated from the second volume 6. The first volume 5 is partially demarcated along the vertical axis Z by two edges 8 extending in a plane XY, with the two edges 8 each extending toward each other, from a side 7. A space 9 is located between the two edges 8, thus allowing the wiper blade of the wiper to be housed in the first volume 5.

The second part 12 of the blade guard 1 is an element made of material that differs from the material used to manufacture the first part 11. It can involve a part added to the first part 11 or co-extruded with the first part 11. The second part 12 is partially housed in the second volume 6 of the first part 11. Thus, the second part 12 comprises a first portion 13 and a second portion 14, the first portion 13 being housed in the second volume 6 and the second portion 14 extending out of the second volume 6, in a direction opposite the partition 15 of the first part 11, along the vertical axis Z. The second portion 14 is intended to come into abutment against a glazed surface of the motor vehicle.

The second portion 14 of the second part 12 is in abutment against borders of the sides 7 of the first part 11. More specifically, the first part 11 is defined by a first dimension 21 measured transversely in the vicinity of the second end 4, whereas the second portion 14 is defined by a second transverse dimension 22 measured along the same axis as the first dimension 21. It is to be noted that the first dimension 21 is less than or equal to the second dimension 22. This configuration allows the surface of the second part 12 in contact with the glazed surface to be increased. Furthermore, this configuration prevents the first part 11 from coming into contact with the glazed surface, with such contact being able to cause damage to the glazed surface, for example, resulting from scratches caused by the first part 11, or even to cause degradation of the surface treatment provided using the product 69.

The first part 11 has a general flared shape. More specifically, the dimension of the first part 11, measured along the transverse axis Y, is greater in the vicinity of the first end 3 than in the vicinity of the second end 4. Similarly, the dimension of the second volume 6 of the first part 11, measured along the transverse axis Y, is greater along the partition 15 than in the vicinity of the second end 4. The first portion 13 of the second part 12, housed in the second volume 6 of the first part 11, has a shape that matches the second volume 6. Thus, the shape of the first portion 13 and of the second volume 6 assists the mechanical retention, along the vertical axis Z, of the first portion 13 of the second part 12 in the first volume 6. Alternatively or cumulatively, the first portion 13 of the second part 12 can be adhered against the partition 15 or against the walls that demarcate the second volume 6, in order to strengthen the connection between the first part 11 and the second part 12 of the blade guard 1.

According to one embodiment, the partition 15 can provide a complete seal between the first volume 5 and the second volume 6. To this end, the partition 15 seamlessly extends from one longitudinal end to the other.

Alternatively, the partition 15 can comprise at least one orifice 17 extending along the vertical axis Z between the first volume 5 and the second volume 6 of the first part 11 of the blade guard 1. The orifice 17 allows a connection to be provided between the first volume 5 and the second volume 6. This configuration is used to facilitate the application of the product 69 in the vicinity of the second part 12 of the blade guard 1, with the second part 12 being at least partially housed in the second volume 6, particularly in the event that the product is included in a flask independent of the blade guard 1 and in the event that the user must apply the product 69 in the vicinity of the second part 12. The partition 15 thus can comprise a plurality of orifices 17 distributed along the longitudinal axis X. Such a design allows the amount of product 69 absorbed by the second part to be increased by supplying a rear zone of this second part 12.

Figure 4:
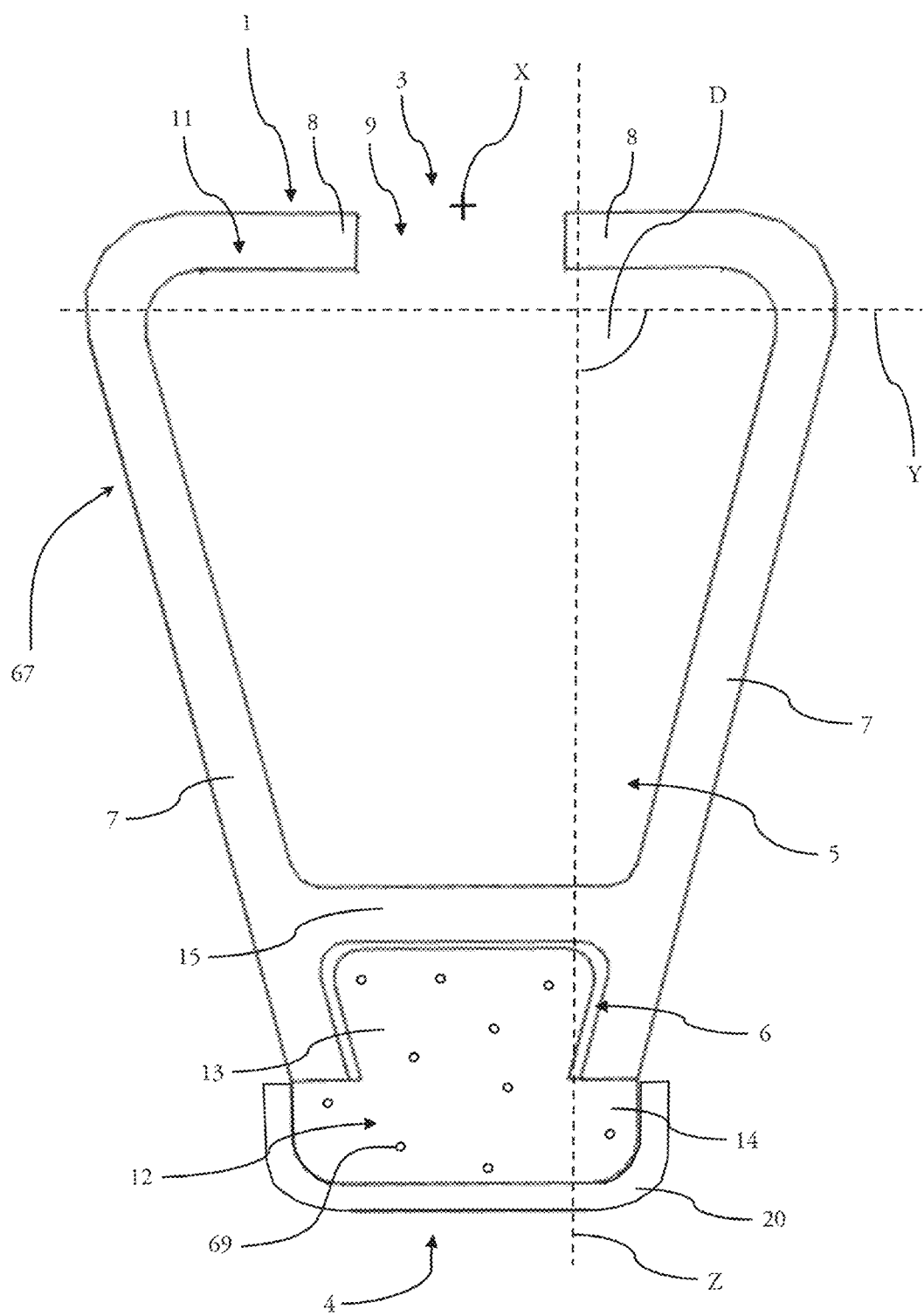
FIG. 4 is an end view of an embodiment of a blade guard according to the first aspect of the invention.

FIG. 4 shows an embodiment of a blade guard 1 comprising a protective strip 20, with the figure showing a longitudinal end 67 of the blade guard 1. With the exception of the protective strip 20, the design of the blade guard 1 is identical to that described in FIGS. 1 and 2, and reference will be made to the description of these figures, which is applicable, mutatis mutandis, to the representation of FIG. 4.

The protective strip 20 is located in abutment on the second part 12 of the blade guard 1. More specifically, the protective strip 20 is in abutment on the second portion 14 of the second part 12, by extending over its front strip and over its lateral sides.

According to this configuration, the protective strip 20 allows the exposure of the second part 12 to the external environment to be reduced, reducing, for example, the risk of the second part 12 drying out or even of being exposed to ultraviolet rays, and thus allowing the shelf life of the product contained in the second part 12 to be increased, for example, when the blade guard 1 is stored or when the wiper equipped with such a blade guard 1 is stored in sales areas.

Figure 5:
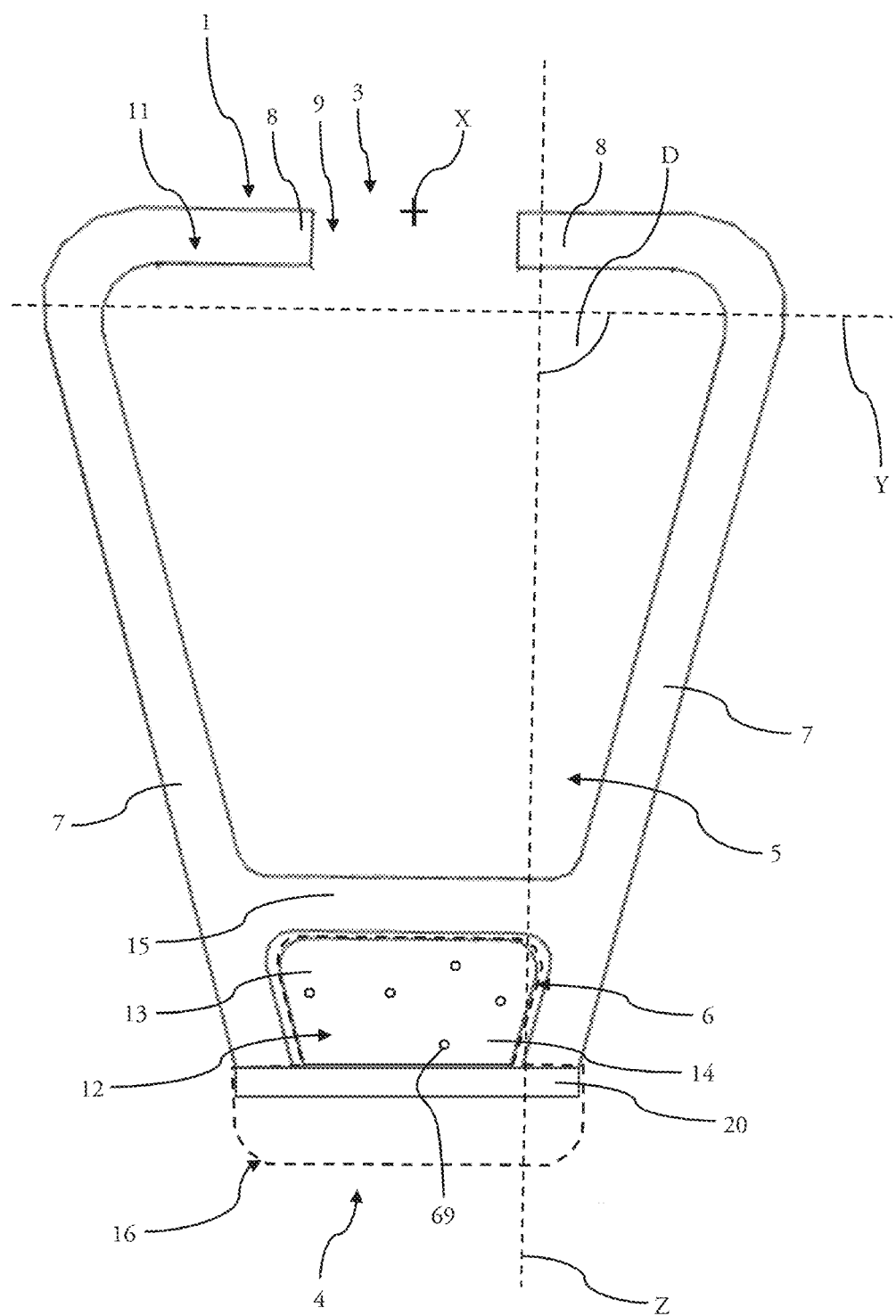
FIG. 5 is a view of another embodiment of a blade guard according to the first aspect of the invention.

FIG. 5 shows a view of a longitudinal end of an embodiment of a blade guard 1 comprising a protective strip 20. With the exception of the position of the protective strip 20, the design of the blade guard 1 is identical to that which has been described in FIGS. 1 and 2, and reference will be made to the description of these figures, which is applicable, mutatis mutandis, to the representation of FIG. 5.

According to this embodiment, the protective strip 20 is in abutment on the sides 7 of the first part 11 of the blade guard 1, thus allowing the second part 12 to be fully housed in the second volume 6 of the first part 11 of the blade guard 1. In this example, the second portion 14 of the second part 12 is confined, by the protective strip 20 attached on the sides 7 of the first part 11, inside the second volume 6 of the first part 11. Thus, the second part 12, comprising the product 69 to be applied onto the glazed surface of the motor vehicle, is entirely, or almost entirely, protected by the sides 7 of the first part 11. The second part 12 is confined in the second volume 6, with such confinement being made possible, for example, by the use, for the second part 12, of an absorbent material, for example, a spongy material, an open-cell structure synthetic foam, a felt or a fabric strip.

When a user removes the protective strip 20 from the blade guard 1, in order to apply the product onto the glazed surface of the motor vehicle, the second portion 14 of the second part 12, which was confined inside the second volume 6 of the first part 11, then extends out of the second volume 6, with the second part 12 then assuming a relaxed shape 16, shown by the dashed lines in FIG. 5, allowing it to be used on the glazed surface.

Figure 6:
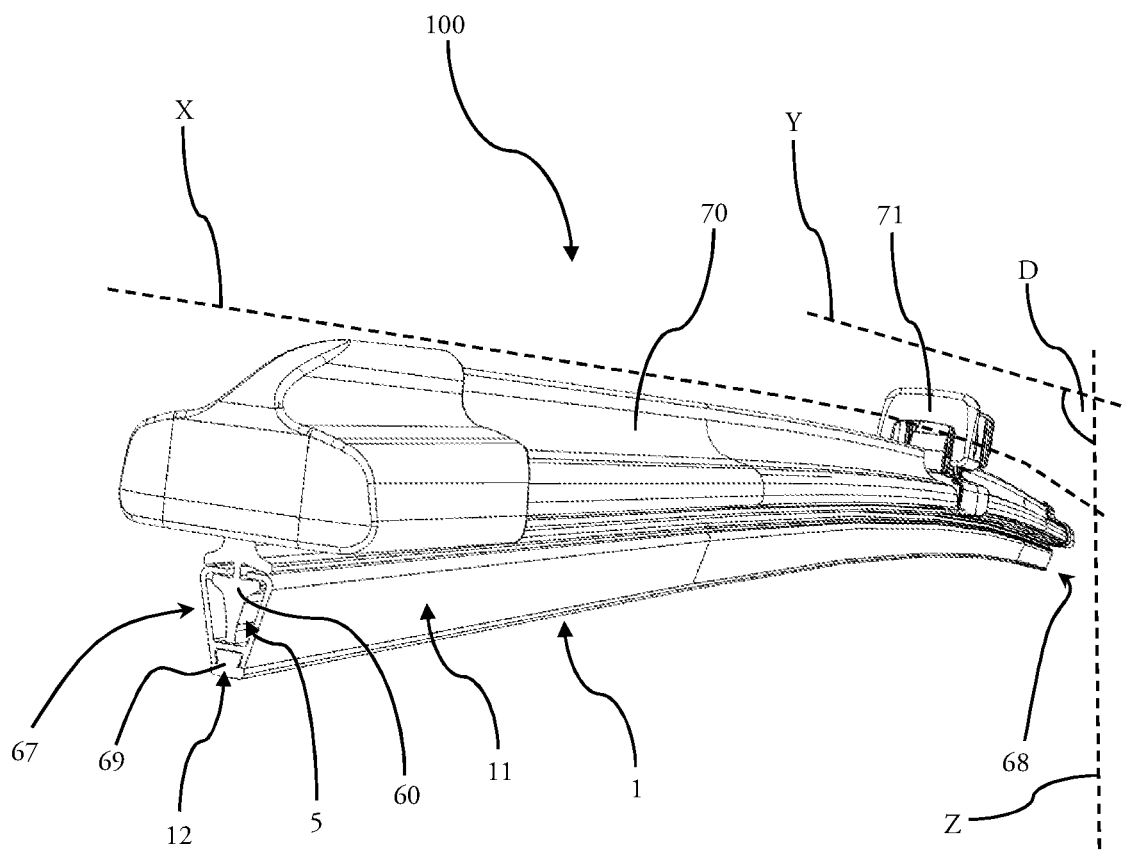
FIG. 6 is a perspective view of an embodiment of a wiper according to the second aspect of the invention.

FIG. 6 shows a perspective view of a wiper 100 according to the second aspect of the invention.

The wiper 100 comprises a wiper blade 60 mounted on a support 70, which comprises an attachment component 71 for assembling the wiper 100 on a drive arm of a wiper system equipping the motor vehicle. The drive arm, when it is activated, allows the wiper 100 to perform reciprocating movements on the glazed surface of the vehicle.

The wiper 100 that cooperates with the blade guard 1, according to the first aspect of the invention or according to the second aspect of the invention, is a flat wiper. It comprises one or more vertebra(e) that give the flat wiper a curvature and that distribute the pressure force from the drive arm over the entire length of the flat wiper. This wiper also can comprise a support 70 that comprises a tunnel, in which a single vertebra is present, with this support also providing the fastening for the wiper blade 60 and/or for one or more air deflector(s). Alternatively, the wiper blade 60 can be adhered on a single vertebra. As a further alternative, the wiper blade 60 can be sandwiched between two vertebrae held in place by a central connector on the wiper.

The wiper blade 60 is partially housed in the first volume 5 of the first part 11 of the blade guard 1, with the blade guard 1 thus providing the protection for the wiper blade 60. The blade guard 1 extends along the longitudinal axis X over the entire length of the wiper blade 60.

The blade guard 1 is specifically configured to follow the change of curvature of the wiper 100, between a significant curvature when the wiper 100 is not pressed against the glazed surface, and a low curvature, even a straight profile, when the wiper 100 is pressed against the glazed surface. It is necessary for the blade guard 1 to follow these movements in order to correctly spread the product 69 over the glazed surface.

Figure 7:
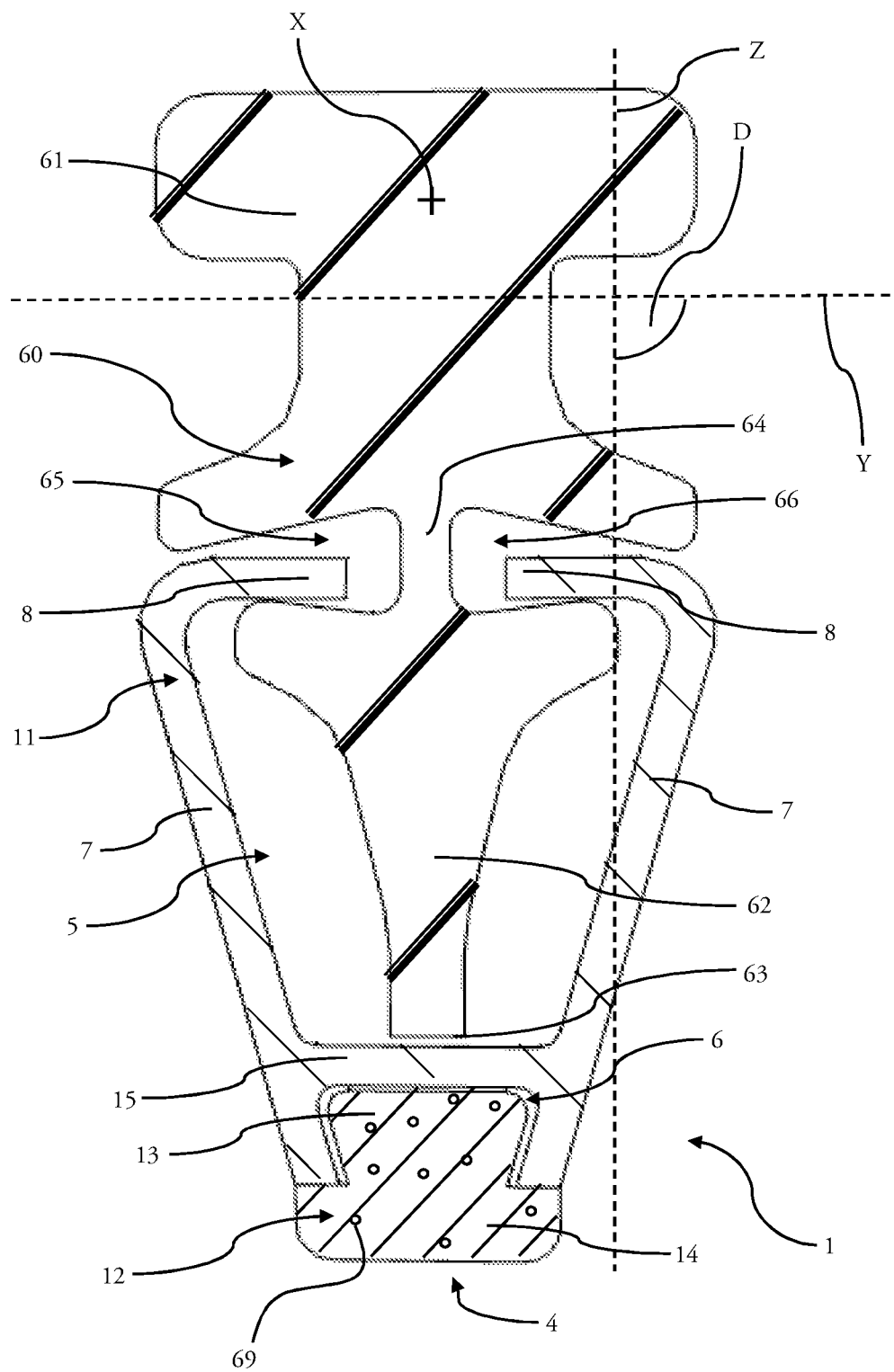
FIG. 7 is a section view of the blade guard and of the wiper blade of the wiper shown in FIG. 6.

FIG. 7 shows an end view of the wiper blade 60 of the wiper 100 shown in FIG. 6, with the wiper blade 60 being housed in a blade guard 1 according to the first aspect of the invention.

The wiper blade 60 is partially housed in the first volume 5 of the first part 11 of the blade guard 1. More specifically, the wiper blade 60 comprises a heel 61 and a tip 62, the heel 61 being intended to be fastened to the support 70 of the wiper, the tip 62 being housed in the first volume 5 of the first part 11. The tip 62 is intended to come into abutment on the glazed surface of the motor vehicle when the blade guard 1 is removed from the wiper and said wiper is pressed on the glazed surface.

The tip 62 of the wiper blade 60 extends from the heel 61 towards the partition 15 of the first part 11 of the blade guard 1, while leaving a gap 63 along the vertical axis Z between the tip 62 and the partition 15. In other words, the tip 62 of the wiper blade 60 is not in abutment against the partition 15 and it is also remote from the sides 7 of the first part 11. This configuration thus provides protection for the wiper blade 60, in particular for the tip 62, which is housed in the first volume 5 of the blade guard 1, by avoiding any unintentional contact of the wiper blade 60 against the blade guard 1.

The wiper blade 60 comprises a joint 64 located between the heel 61 and the tip 62. The dimension of the joint 64 along the transverse axis Y is smaller than a dimension along the transverse axis Y of the heel 61 and than a dimension along the transverse axis Y of the tip 62. Thus, the joint 64 defines a first groove 65 and a second groove 66 that each house an edge 8 of the first part 11 of the blade guard 1. Thus, the heel 61 and the tip 62 of the wiper blade 60 allow the blade guard 1 to be held against the wiper blade 60, with the edges 8 of the blade guard 1 being housed in the grooves 65 and 66.

The blade guard 1 thus must be installed on the wiper blade 60 through a relative translation movement of the blade guard 1 in relation to the wiper blade 60 along the longitudinal axis X. The operation for removing the blade guard 1 from the wiper blade 60 is similar to the installation of the blade guard 1 on the wiper blade 60.

The tip 62 of the wiper blade 60, which is housed in the first volume 5 of the first part 11 of the blade guard 1, is in abutment along the vertical axis Z against the edges 8 of the first part 11 of the blade guard 1.

Thus designed, the wiper 100 and its blade guard 1 can be attached to the drive arm of the wiper system of the vehicle, pressed against the glazed surface, then moved so that the blade guard 1 spreads the product 69 over the glazed surface.

Of course, the invention is not limited to the aforementioned embodiments and numerous changes can be made to these embodiments without departing from the scope of the invention.

The invention claimed is:

1. A blade guard for a wiper of a vehicle, the blade guard extending along a longitudinal axis, the blade guard comprising:
   a first part; and
   a second part,
   the first part being configured to enable the blade guard to be attached on the wiper such that a tip of a wiper blade is entirely housed and retained within a first volume of the first part,
   wherein the second part is configured to come into contact with a glazed surface of the vehicle, the second part being configured to contain a product to be applied onto the glazed surface,
   wherein the blade guard is flexible in order to assume a first profile, in which the blade guard is curved along the longitudinal axis, and at least one second profile, in which the blade guard is substantially straight,
   wherein the first profile follows a curved profile of the wiper of the vehicle,
   wherein the second part is housed in a second volume of the first part, the first volume and the second volume being separated by a partition that extends in a plane, wherein the partition contains an orifice that extends in a vertical direction relative to the plane, the orifice being configured to fluidly connect the first volume to the second volume, and wherein the second part extends away from the first volume in the vertical direction for contacting the glazed surface.

2. The blade guard according to claim 1, comprising the product included in the second part.

3. The blade guard according to claim 1, wherein the second part is formed by an absorbent material configured to contain the product.

4. The blade guard according to claim 1, wherein the second part is configured to retain the product on an external surface of the second part.

5. The blade guard according to claim 2, wherein the product is a hydrophobic solution.

6. The blade guard according to claim 1, wherein the second part comprises a first portion, the shape of which matches a shape of the second volume, and a second portion that projects from the second volume.

7. The blade guard according to claim 1, comprising a protective strip configured to protect the second part.

8. A wiper comprising a wiper blade and the blade guard according to claim 1 disposed on the wiper blade.

* * * * *